United States Patent
O'Ree

(10) Patent No.: US 11,216,294 B2
(45) Date of Patent: Jan. 4, 2022

(54) USER INTERFACE BY WAY OF UNKNOWN DATA STRUCTURE

(71) Applicant: The Government of the United States, as represented by the Secretary of the Army, Washington, DC (US)

(72) Inventor: Alexander O'Ree, Forest Hill, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 688 days.

(21) Appl. No.: 15/235,469

(22) Filed: Aug. 12, 2016

(65) Prior Publication Data

US 2018/0046688 A1 Feb. 15, 2018

(51) Int. Cl.
*G06F 9/451* (2018.01)
*G06F 9/455* (2018.01)
*G06F 16/242* (2019.01)

(52) U.S. Cl.
CPC .......... *G06F 9/45516* (2013.01); *G06F 9/451* (2018.02); *G06F 16/2423* (2019.01)

(58) Field of Classification Search
CPC .......... G06F 17/30569; G06F 17/2247; G06F 17/30424; G06F 3/048; G06F 9/45516; G06F 16/2423
See application file for complete search history.

(56) References Cited

U.S. PATENT DOCUMENTS

| | | | | |
|---|---|---|---|---|
| 2005/0071342 A1* | 3/2005 | Calusinski | ........ | G06F 17/30525 707/999.1 |
| 2008/0141113 A1* | 6/2008 | Megiddo | ............ | G06F 17/2247 715/234 |
| 2012/0072825 A1* | 3/2012 | Sherkin | ............ | G06F 17/30719 715/234 |
| 2012/0072826 A1* | 3/2012 | Sherkin | ............... | G06F 17/2247 715/234 |
| 2012/0130987 A1* | 5/2012 | Bose | ................. | G06F 17/30489 707/718 |
| 2012/0137235 A1* | 5/2012 | T S | ........................... | G06F 8/34 715/763 |
| 2013/0159882 A1* | 6/2013 | Wolge | ............... | G06F 17/30572 715/753 |

* cited by examiner

*Primary Examiner* — Stephen S Hong
*Assistant Examiner* — Nicholas Hasty
(74) *Attorney, Agent, or Firm* — Ronald Krosky

(57) ABSTRACT

Various embodiments are described that relate to creating a user interface when a data structure is unknown. An application can be used to discover the content of that unknown data structure at runtime. Part of this discovery can include conversion of that data structure from a virtual machine class to a markup language. The discovered content can be used to build a user interface presented on a display. The user interface can be interactive such that information is entered into the user interface. That entered information can be retained in a database as can the discovered content. The entered information along with the content can be converted from the markup language to the virtual machine class back to an originator of the unknown data structure. This way, the originator receives a response in a format usable by the originator.

20 Claims, 18 Drawing Sheets

USER INTERFACE BY WAY OF UNKNOWN DATA STRUCTURE

GOVERNMENT INTEREST

The innovation described herein may be manufactured, used, imported, sold, and licensed by or for the Government of the United States of America without the payment of any royalty thereon or therefor.

BACKGROUND

A mobile device can communicate with various entities, such as a base station or another mobile device. As part of this communication, information sets can be transmitted between the mobile device and an entity. The mobile device and the entity may communicate in different manners and therefore an information set sent from the entity to the mobile device may be of an unknown data structure to the mobile device.

SUMMARY

In one embodiment, a system comprises a collection component, an evaluation component, a creation component, and an output component. The collection component can be configured to collect an information set formatted in a data structure, the data structure being unknown to the collection component upon collection and a content of the information set being unknown to the collection component upon collection. The evaluation component can be configured to perform an evaluation of the information set after collection, the evaluation determines the content of the information set. The creation component can be configured to create a user interface that discloses at least part of the content of the information set. The output component can be configured to cause disclosure of the user interface upon a display.

In another embodiment, a method comprises obtaining an information set in an unknown format. The method also comprises identifying an information classification expected in the information set and searching the information set for a piece of information that meets the information classification. In addition, the method comprises identifying the piece of information that meets the information classification as a result of the search and recording the piece of information that meets the information classification in a database location associated with the information classification.

In yet another embodiment, a method comprises obtaining an information set of an unknown data structure. Additionally the method comprises, at runtime, discovering the data structure of the information set after the information set is obtained such that the unknown data structure is known and identifying the content of the information set after the data structure is discovered. The method also comprises creating an item for presentation upon a display based, at least in part, on the content and causing presentation of the item upon the display.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
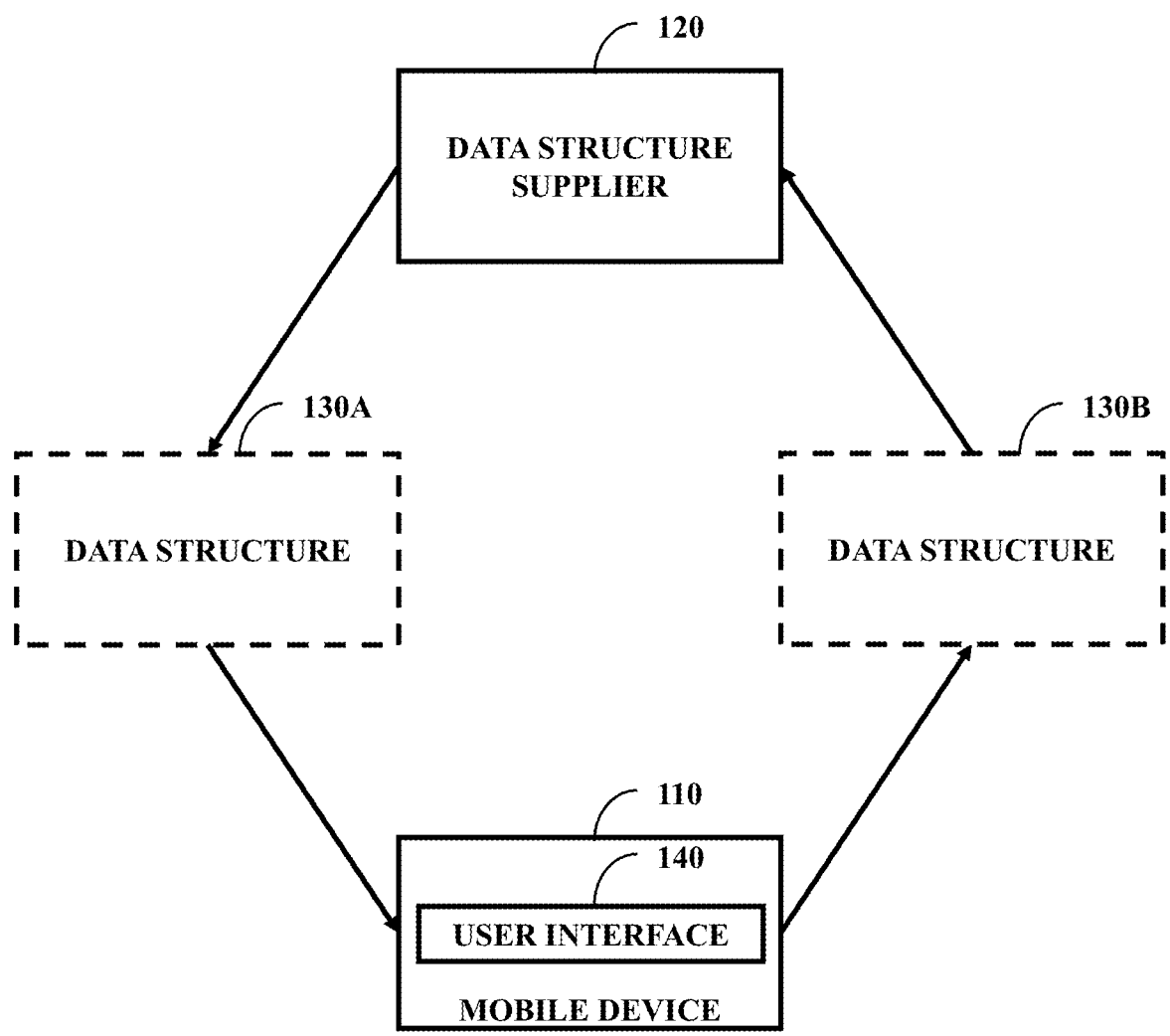
FIG. 1 illustrates one embodiment of an exchange between a mobile device and a data structure supplier.

In one embodiment, a large organization can have many different data structures with varying content and formats. Furthermore, these data structures can change over time. This large number of data structures can be too numerous for a mobile device to manage and track (e.g., manage and track in a single application). Furthermore, a single application can be tied into a specific data structure with difficulty in upgrading the single application.

In view of this, a pluggable data architecture can be used to dynamically discover content of the data structures. Example content can include presentation of data, conversion to and from mappables (e.g., minimal set of information to visualize data in geospatial terms, such as geographic coordinates, entity ID (identification or identifier) and symbol representation), metadata extraction (e.g., extraction of a minimal set of metadata about a payload designed to facilitate database storage, indexing, and querying such as geographic coordinates, temporal information, payload contents, and unique ID), and payload class name.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action (s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of an exchange between a mobile device 110 (e.g., radio, smartphone, laptop computer, etc.) and a data structure supplier 120 (e.g., another mobile device or a base station). In FIG. 1, two versions of a data structures are shown: data structure 130A and 130B. A large organization, that employs the mobile device 110 and the data structure supplier 120, can use a large number of different data structures (e.g., information exchange structures) to communicate information, such as geo-spatial information (e.g., time, date, longitude, latitude, etc.). The different data structures can be different ways the information is formatted.

As one can imagine, having a large number of different data structures can be hard to manage. Further, as new data structures are introduced, existing platforms can struggle with these new structures. Therefore, an application can be used where the data structure is unknown at to the mobile device 110 until runtime. This application can be used to determine the content of the data structure.

In one example, the data structure can contain information to render something on a map, such as render an icon at a certain position on the map. The application can identify the minimum information to correctly render the icon on the map. In one example, minimum information can be latitude, longitude, and an icon identifier (e.g., infantry, artillery, etc.).

The data structure supplier 120 can send position information for a military unit. This position information can be in the data structure 130A. This data structure can have a specific format (e.g., longitude listed first and latitude information second) as well as have information beyond a minimum (e.g., name and rank of commanding officer for the unit for which the position information applies). The mobile device 110 can expect the data structure 130A to be sent with the longitude and latitude information, but not know the format and also not know what extra information the data structure 130A incudes. The application can, at runtime, process the data structure to find this information.

Additionally, the information in the data structure 130A can be stored (e.g., locally upon the mobile device 110 or upon a remote database). A metadata extractor can be used to collect information from the data structure 130A, select information for storage, and cause the selected information to be stored. Store information can include information set from the data structure supplier 120 as well as information supplied by the mobile device 110.

In one embodiment, the data structure 130A contains information for a user survey that is disclosed as a user interface 140 on a display of the mobile device 110. A user of the mobile device can enter extra information in response to the user survey. The extra information can be stored and be sent back to the data structure supplier 120 (e.g., a company running the survey). The mobile device 110 can convert the extra data into the data structure 130B (e.g., along with the information in the data structure 130A) so the data structure supplier 120 can understand and interpret the extra information.

The data structure 130A can include a pluggable data metadata descriptor (e.g., a plain text file, eXtensible Markup Language (XML), or Javascript Object Notation (JSON)) describing the data structure 130A. The pluggable data metadata descriptor can be used by the mobile device 110 to know the unknown data structure (e.g., by reading the descriptor). Example information in the descriptor can include payload class (e.g., object orientated class name), user interface class (e.g., capable of rendering custom views of payload contents), package name (e.g., identifier for data structure content distribution in a continuous delivery mechanism), metadata extractor class name (e.g., pulls out specific information and supports text search), mappable converter (e.g., converter when a map is the user interface 140), and/or versioning (e.g., version definer).

Figure 2:
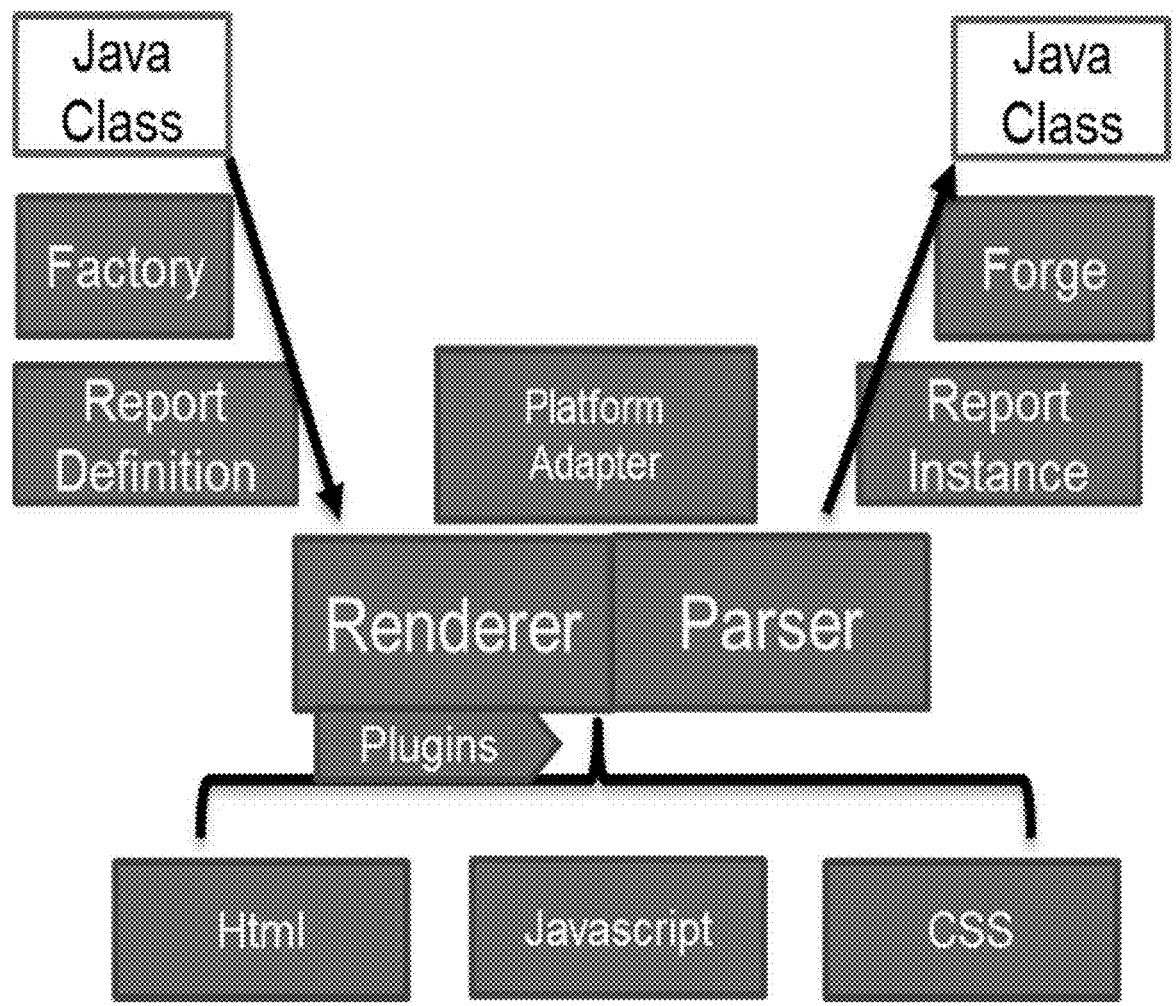
FIG. 2 illustrates one embodiment of a system that can implement as a webform user interface parsing and rendering system.

FIG. 2 illustrates one embodiment of a system 200 that can implement as a webform user interface parsing and rendering (WHISPER) system. The WHISPER system can produce the user interface 140 of FIG. 1 upon the mobile device 110 of FIG. 1, such as by way of a webpage that can function without an Internet connection. The user interface 140 of FIG. 1 can be readable and writable. The WHISPER system can receive a data structure that is unknown to the WHISPER system—the format is unknown and the actual contents are unknown, but the classification of the content may be known or expected (e.g., don't know where in the data structure the latitude will be listed or what the value of the latitude will be, but expect latitude to be included). The WHISPER system can then create the user interface 140 of FIG. 1. The user interface 140 of FIG. 1 can be of a standard format (e.g., different data structures are made to look like a common interface familiar to a user) or can be specifically formatted based on the data structure received (e.g., if position is listed before time in the data structure, then in the user interface position is listed before time).

The WHISPER system can also take information entered into the user interface and convert that information (e.g., along with the underlying information used to create the data structure) to a data structure (e.g., the same structure type as was initially received). In one example, a restaurant survey can be sent out as the data structure 130A of FIG. 1. The WHISPER system can reside upon the mobile device 110 of FIG. 1 and present the survey to the user. The user can respond to the survey. The survey with the response can be converted by the WHISPER system to the data structure 130B and send back to the survey requestor, here the data structure supplier 120 of FIG. 1.

With the WHISPER system, the mobile device 110 of FIG. 1 can take different data structures and produce a user interface from the different data structures. These user interfaces can be identical (e.g., look the same except for content from the data structure), look similar, or look different. The WHISPER system can be configured to manage data entry into the user interface. Returning to the restaurant example, allowable answers can be one to five stars. If someone enters a letter as opposed to a number of one through five, the WHISPER can be designed to reject that entry or otherwise handle such an entry.

In one example, the data structure can be a virtual machine class (e.g., Java class file). The WHISPER system, such as by way of a factory, can convert the virtual machine class into an intermediary format (e.g., a definition such as a report definition) through reflection (e.g., runtime inspection of what is in the class). The WHISPER system can further define the definition. The virtual machine class file can be annotated with additional metadata to support user feedback and help, field validation rules (e.g. min/max lengths, textual pattern matching), etc. In one example, the restaurant example can have acceptable survey entries for the user interface of one to five—as opposed to allowing any integer, the acceptable value can be limited to one to five. Expanding on the restaurant example, the survey entry can prompt the user for a list of menu items that was consumed during the visit. The list can have a minimum or maximum number of sub items defined. The WHISPER conversion from virtual machine class into an intermediary format can use a bidirectional recursive algorithm that supports many built in types of data, including by not limited to: string, integers, floats, doubles, date/time, lists, arrays, Boolean, and enumerations. Bidirectional, in this instance, can refer to converting from the intermediary format into a virtual machine class instance (e.g., performed by the Forge in the system 200).

The WHISPER system can use a renderer to take the definition and convert it into the user interface 140 of FIG. 1. The user interface can be created in a markup language (e.g., HTML). The user interface can be used to submit an entry, such as restaurant star ratings (e.g., star rating for food quality, star rating for cleanliness, average star rating, etc.). This submitted information can be extracted by a parser of the WHISPER system. The parser can take the entry (e.g., JavaScript Object Notation) and convert it from the markup language to an instance (e.g., indexes of original structure). In one example, the instance can be limited to what the user entered into the user interface 140 of FIG. 1. The WHISPER system can employ a forge to take the instance, combine it with the definition, combine them together, and convert the combination into the virtual machine class. This virtual machine class produced by the forge can be understandable by the data structure supplier 120 of FIG. 1 and be of the same virtual machine class as what the data structure supplier 120 of FIG. 1 sent.

Figure 3:
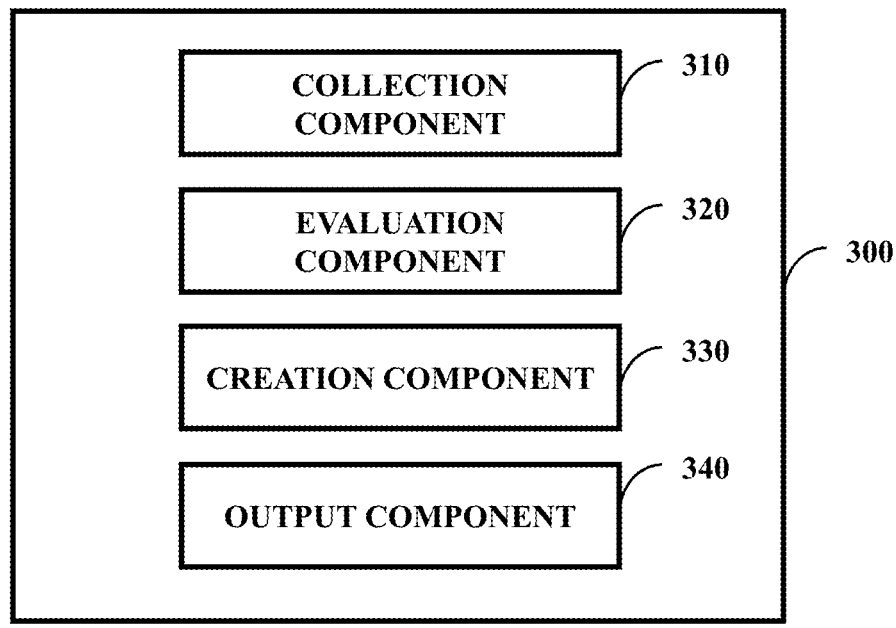
FIG. 3 illustrates one embodiment of a system comprising a collection component, an evaluation component, a creation component, and an output component.

FIG. 3 illustrates one embodiment of a system 300 comprising a collection component 310, an evaluation component 320, a creation component 330, and an output component 340. The collection component 310 can be configured to collect an information set formatted in a data structure (e.g., the data structure 130A of FIG. 1). In one example, the system 300 can be resident upon the mobile device 110 of FIG. 1 and the collection component 310 can be, in one embodiment, software of the mobile device 110 of FIG. 1 that obtains the data structure. The data structure can be unknown to the collection component 310 upon collection (e.g., unknown to the collection component 310 and/or unknown to the mobile device 110 of FIG. 1 upon which the collection component 310 resides). Additionally, a content of the information set can be unknown to the collection component 310 upon collection. However, the collection component 310 can expect content of the data structure (e.g., expect position information to be included).

The evaluation component 320 (e.g., a pluggable data scanner that caches information in a content registry) can be configured to perform an evaluation of the information set after collection. This evaluation determines the content of the information set. Additionally, this evaluation can be performed at runtime and determine a classification of the data structure such that the data structure is known. The evaluation component 320 can employ at least one application to perform the evaluation. As part of the evaluation, the evaluation component 320 can determine the application to use in performance of the evaluation and download the determined application.

The creation component 330 can be configured to create (e.g., generate and/or edit) a user interface (e.g., the user interface 140 of FIG. 1). The user interface can disclose at least part of the content of the information set. Creation of the user interface can include building a new user interface, modifying an existing user interface, or using a template from which to construct the user interface. The output component 340 can be configured to cause disclosure of the user interface upon a display (e.g., a display of the mobile device 110 of FIG. 1). The created user interface can be configured to have information entered after being outputted or be static.

The user interface can be based on a markup language and entry into the user interface can be in a markup language. However, the data structure can be a virtual machine class. The evaluation component 320 can configured to convert the data structure from a virtual machine class to a report definition. The creation component 330 can be configured to use the report definition to create the user interface. In one example, the creation component 330 can employ or be, at least in part, the renderer of the system 200 of FIG. 2 to convert the report definition to the markup language and use the markup language to create the user interface). Therefore, components disclosed herein can function as at least part of the system 200 of FIG. 2.

In one embodiment, the creation component 330 can comprise a visualization component. The visualization component can be configured to produce a visualization (e.g., a map that functions as the user interface) that represents at least part of the information set. The output component 340 can be configured to cause disclosure of the visualization upon the display.

Figure 4:
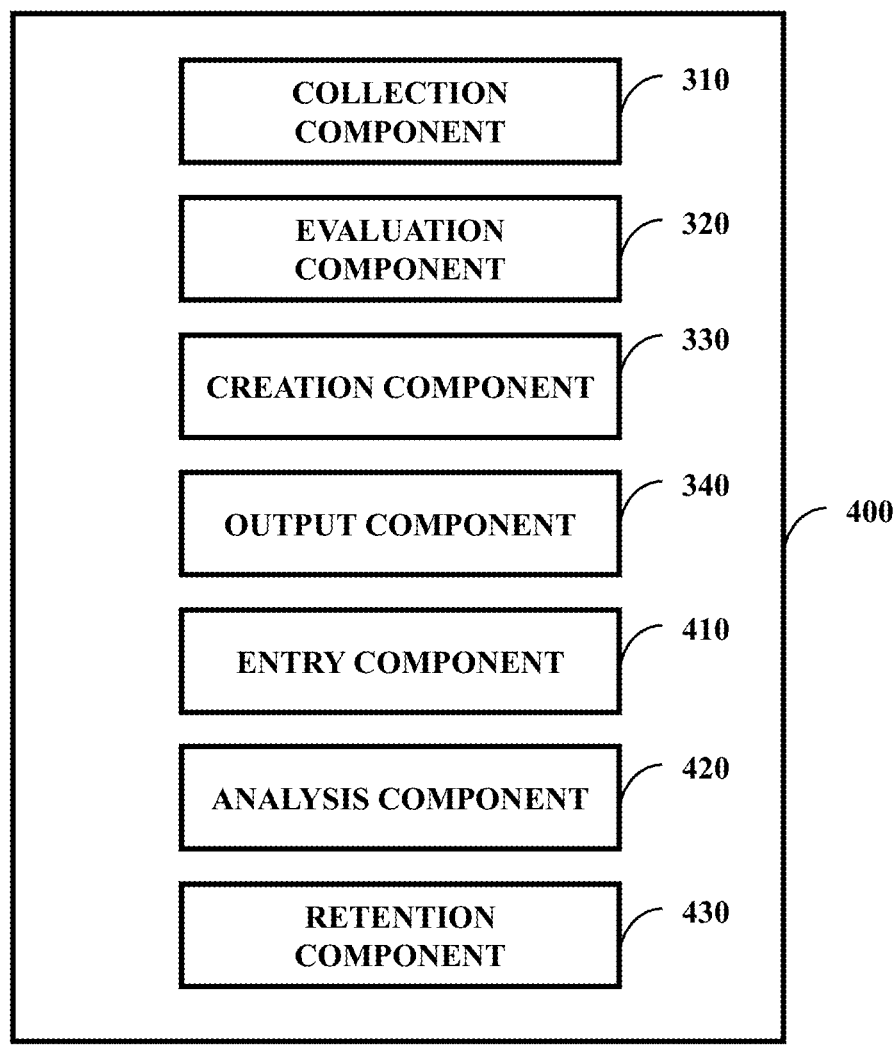
FIG. 4 illustrates one embodiment of a system comprising the collection component, the evaluation component, the creation component, the output component, an entry component, an analysis component, and a retention component.

FIG. 4 illustrates one embodiment of a system 400 comprising the collection component 310, the evaluation component 320, the creation component 330, the output component 340, an entry component 410, an analysis component 420, and a retention component 430. As discussed above, the user interface can be configured to receive an entry. The entry component 410 can be configured to access the entry into the user interface. The analysis component 420 can be configured to analyze the entry into the user interface to determine a content of the user interface. The retention component 430 can be configured to cause retention of at least part of the entry into a database, cause retention of part of the content in a database in a content-specific location, and/or cause retention of part of the content in a database in a general location (non-content-specific location).

Figure 5:
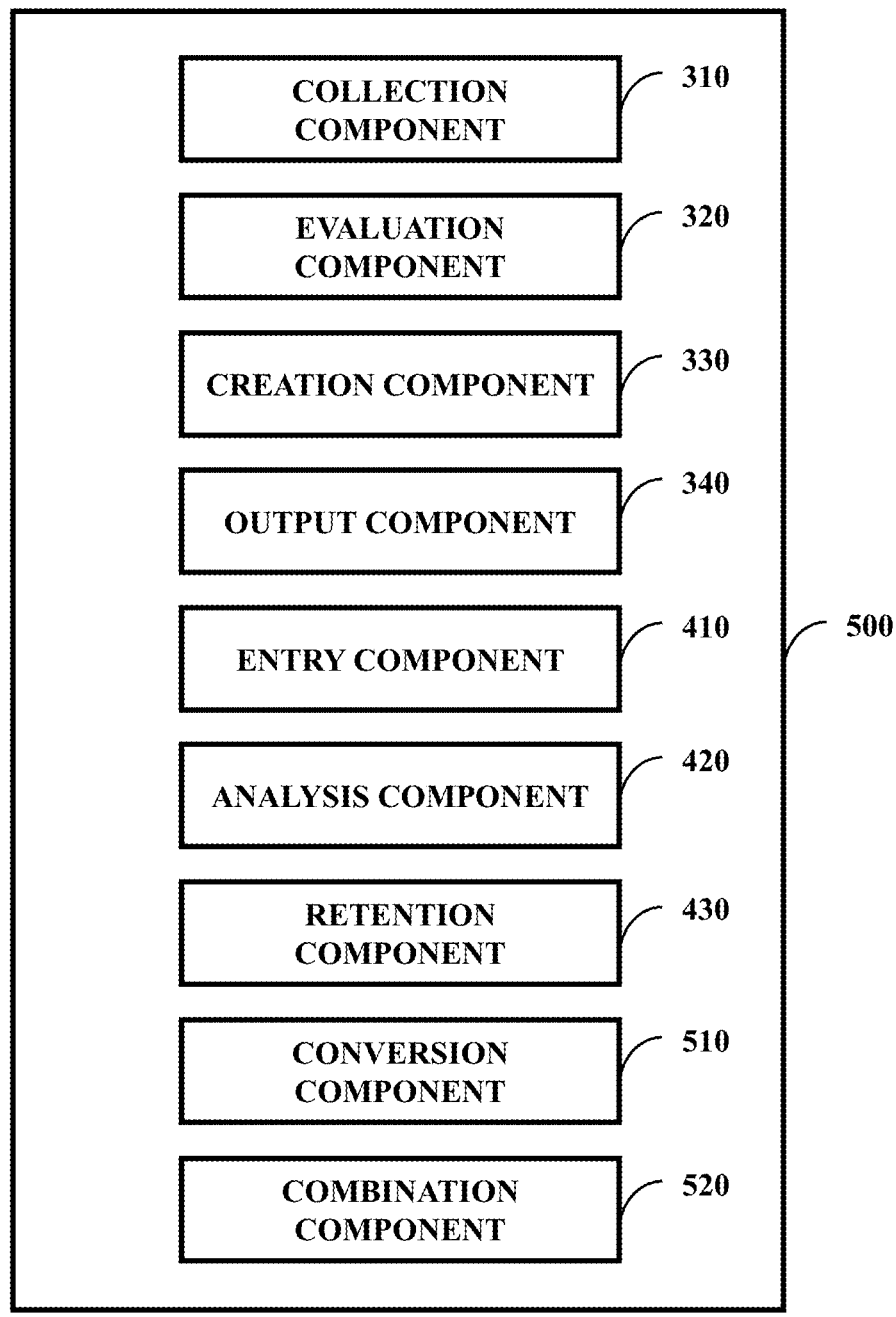
FIG. 5 illustrates one embodiment of a system comprising the collection component, the evaluation component, the creation component, the output component, the entry component, the analysis component, the retention component, a conversion component, and a combination component.

FIG. 5 illustrates one embodiment of a system 500 comprising the collection component 310, the evaluation component 320, the creation component 330, the output component 340, the entry component 410, the analysis component 420, the retention component 430, a conversion component 510, and a combination component 520. The conversion component 510 can be configured to convert the entry into the user interface into a report instance (e.g., by way of the parser of the system 200 of FIG. 2). The combination component 520 can be configured to combine the report instance with a report definition (e.g., that includes the user interface absent the entry) into a single construct (e.g., by way of the forge of the system 200 of FIG. 2). The single construct can be in the virtual machine class.

The single construct can then be transferred to a supplier of the collected data structure or to a different location. In one embodiment, the output component 340 can function as a transfer component. The transfer component can be configured to cause a transfer of the single construct to an entity that provides the information set formatted in the data structure (e.g., data structure supplier 120 of FIG. 1).

Figure 6A:
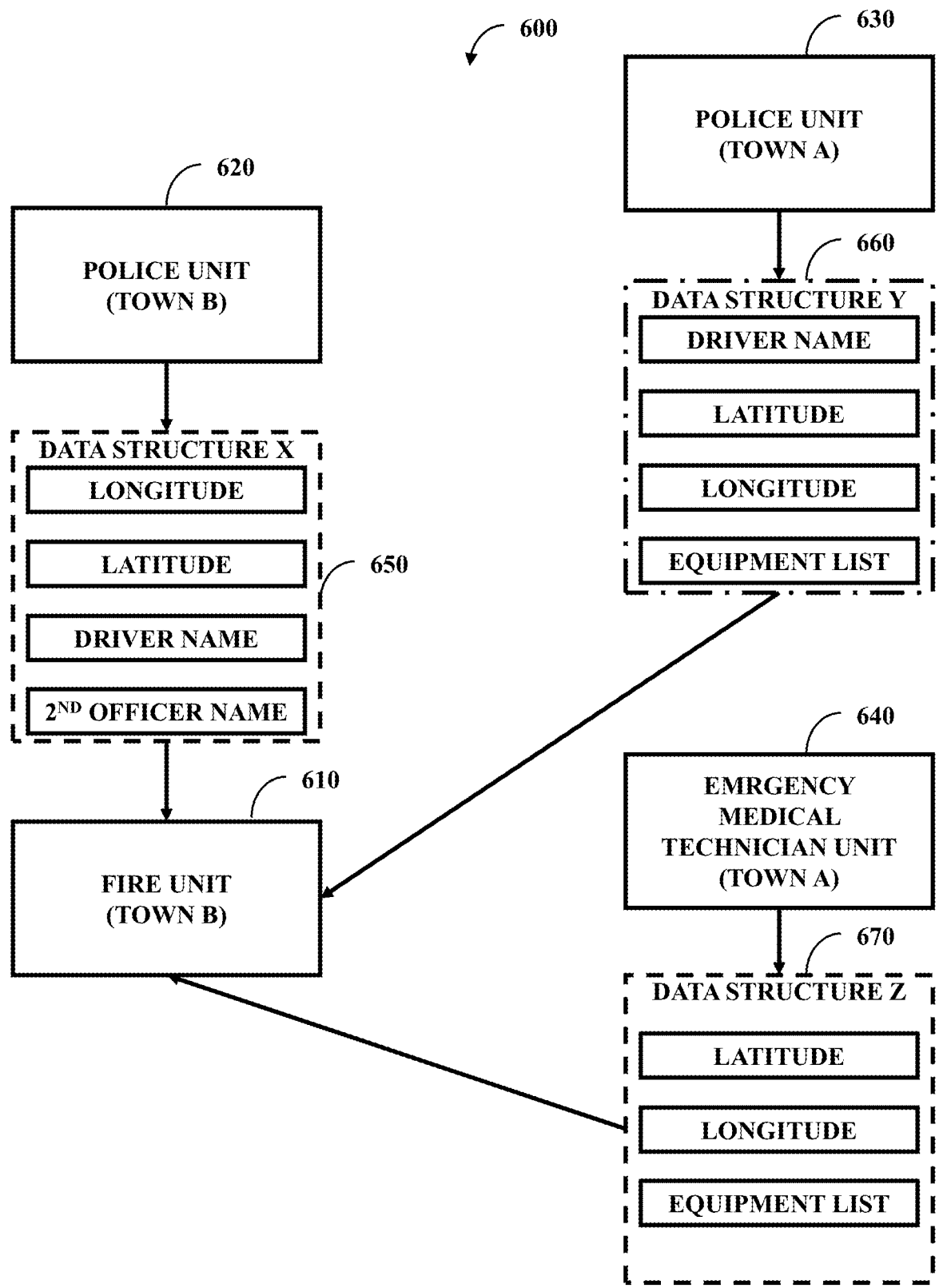
FIG. 6A illustrates one embodiment of an environment upon which at least some aspects disclosed herein can be practiced.
Figure 6B:
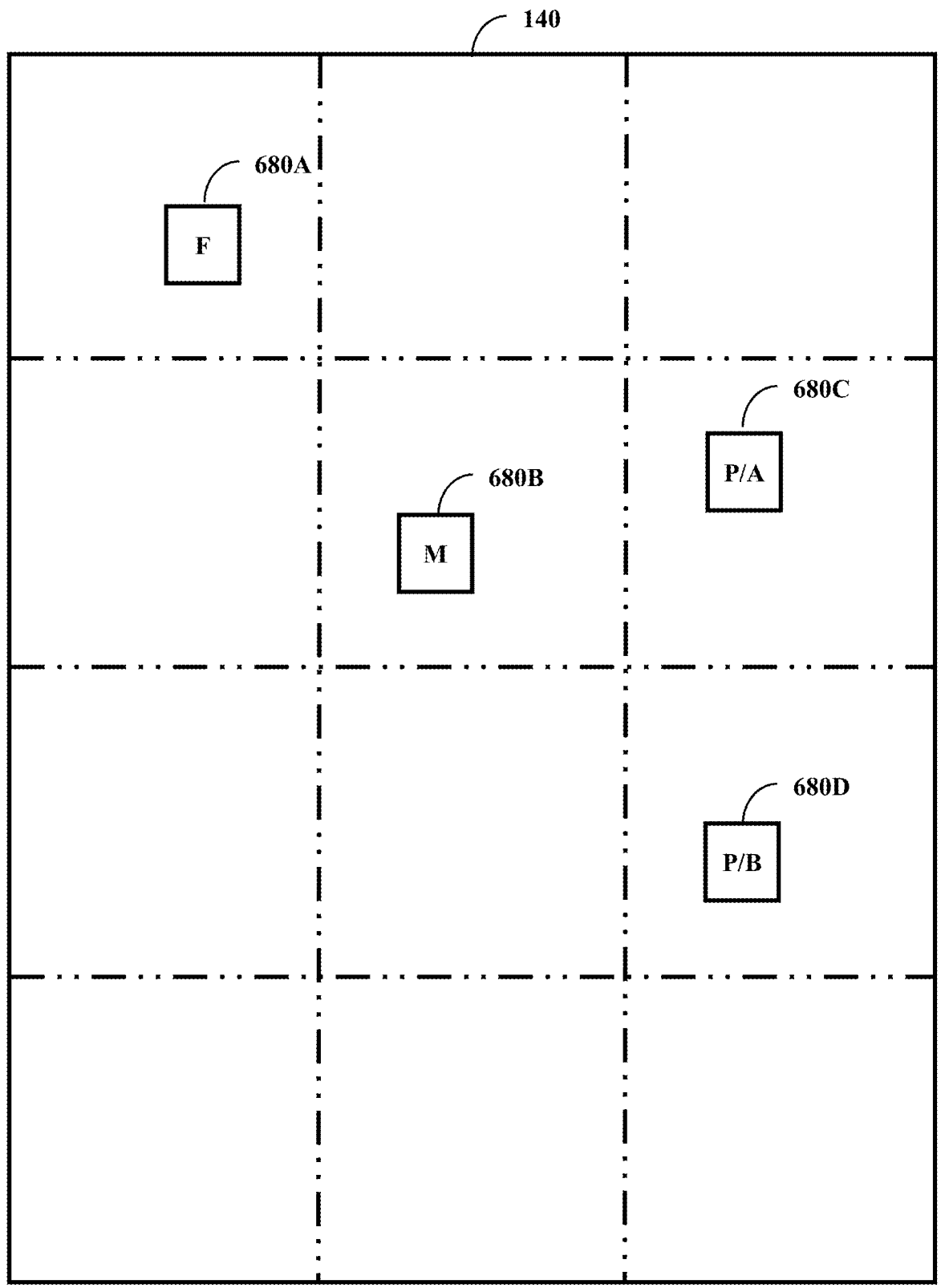
FIG. 6B illustrates one embodiment of a user interface.

FIG. 6A illustrates one embodiment of an environment 600 upon which aspects disclosed herein can be practiced and 6B illustrates on embodiment of the user interface 140. FIGS. 6A and 6B can be collectively referred to as FIG. 6. FIG. 6 can illustrate a possible scenario in which aspects disclosed herein can be practiced.

Two municipalities can border one another: town A and town B. A major fire can occur in town B and town B can call upon the resources of town A along with town B's resources to mitigate damage from the major fire. Town B can dispatch their fire unit 610 and its police unit 620. Town A can send a police unit 630 and an emergency medical technician (EMT) unit 640. The police unit 520 of town B can use their own data structure 650 (data structure X). While it may be similar to a data structure used by the fire unit 610 of town B, police specific information can be included such as a driver of a patrol car of the police unit 620 that may not be in the data structure used by the fire unit 610.

Similarly, the police unit of town A can use a data structure 660 (data structure Y) similar to a data structure 670 used by the EMT unit of town A. However, they can also be different, such as driver name being in the data structure 660, but not data structure 670. Therefore, in this scenario there are data structures 650-670 that contain different information and order their information differently, with order being top to bottom as illustrated. As can also be seen, different towns can have different content of the data structures (town A has equipment list for its data structures 660 and 670, while town B does not) and different units can have the same content (police unit data structures 650 and 660 have driver name despite being from different towns) albeit in different order (listed first for data structure 660 and third for data structure 650).

In an emergency situation, it can be important for the fire unit to know where different units are physically located. As an example, a victim from the fire can be identified by the fire unit 610. The victim can need extensive medical assistance and therefore benefit from quick treatment from the EMT unit 640. Therefore, the fire unit can have a display that presents the user interface 140. The user interface 140 can have four icons 680—their own icon 680A, one for the EMT 680B, one for police from town A 680C, and one for police from town B 680D. With this, the fire unit 610 can know where the EMT unit 640 is located and transfer the victim to the location if that is the best course of action (e.g., roads are blocked so an ambulance beneficial or gurney beneficial for treatment cannot be moved closer).

The fire unit 610 can employ aspects disclosed herein to produce the user interface 140 with the icons 680A-D. In one example, the fire unit 610 can employ at least part of the system 200 of FIG. 2 and/or the system 300 of FIG. 6 to collect the three different data structures 650-670. The data structures 650-670 can be processed to find the important longitude and latitude information and use the longitude and latitude information for plotting the location on the user interface 140.

Figure 7:
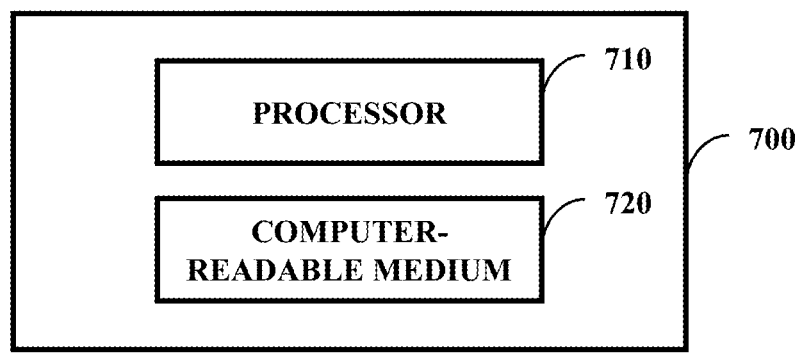
FIG. 7 illustrates one embodiment of a system comprising a processor and a computer-readable medium.

FIG. 7 illustrates one embodiment of a system 700 comprising a processor 710 (e.g., a general purpose processor or a processor specifically designed for performing a functionality disclosed herein) and a computer-readable medium 720 (e.g., non-transitory computer-readable medium). In one embodiment, the computer-readable medium 720 is communicatively coupled to the processor 710 and stores a command set executable by the processor 710 to facilitate operation of at least one component disclosed herein (e.g., the evaluation component 320 of FIG. 3). In one embodiment, at least one component disclosed herein (e.g., the evaluation component 320 of FIG. 3) can be implemented, at least in part, by way of non-software, such as implemented as hardware by way of the system 700. In one embodiment, the computer-readable medium 720 is configured to store processor-executable instructions that when executed by the processor 710, cause the processor 710 to perform a method disclosed herein (e.g., the methods 800-1500 addressed below).

Figure 8:
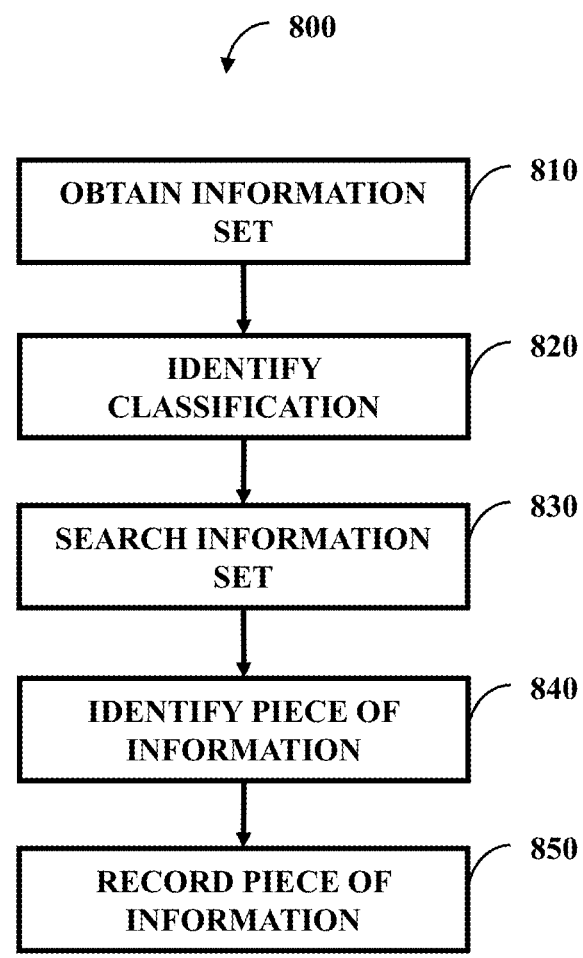
FIG. 8 illustrates one embodiment of a method comprising five actions.

FIG. 8 illustrates one embodiment of a method 800 comprising five actions 810-850. At 810, obtaining an information set in an unknown format can occur and at 820, identifying an information classification expected in the information set can take place. There can be, at 830, searching the information set for a piece of information that meets the information classification. At 840, identifying the piece of information that meets the information classification as a result of the search can occur. Recording the piece of information that meets the information classification in a database location associated with the information classification can take place at 850.

Returning to the emergency example of FIG. 6, the two police units 620 and 630 and the EMT unit 640 can be associated with vehicles (e.g., patrol car or ambulance, respectively). These vehicles can individually have a license plate number and the license plate number can be included in the data structures 650-670. The method 800 can operate in an environment where information in data structures is stored in a database, such as the license plate numbers.

Certain information, such as the license plate number, can be expected in a data structure. When the information set is obtained at 810 a receiver can expect the license plate to be included in the information set at 820. With this, the receiver can search the information set at 830 for the license plate information to identify at 840 and store at 850.

In one embodiment, the method 800 can run multiple times on the information set (e.g., in series or in parallel) or function in one action on multiple pieces of information (e.g., license plate and vehicle make/manufacturer). However, other pieces of information can be included in the information set. This information can be information simply not expected (e.g., yet able to be recognized) or information indiscernible. Examples can include vehicle fuel level (e.g., understandable, but not expected) or city-specific unit code (e.g., when from a town A unit indiscernible to a unit of town B). This information can still be beneficial to retain in the database. At 840 identifying a piece of information of the information set that does not meet the classification can occur (e.g., along with recognizing that the piece of information is unable to be classified. At 850, recording the piece of information of the information set that does not meet the classification in a general storage location of the database can occur (e.g., while the piece of information that meets the information classification is recorded in a specific storage location of the database different from the general storage location).

In one example, again returning to the scenario discussed in FIG. 6, the fire unit can classify the longitude and latitude in specific parts of the database (e.g., a dedicated location for longitude and dedicated location for latitude). However, other information in the data structures 650-670, such as the driver name in data structure 660, may be not classifiable by the fire unit 610. Nonetheless, there can be value for such information being retained in the database. For example, the EMT unit 640 could desire to know what officer is present in police unit 630 for chain of command purposes. Therefore, when populating the database, the fire unit 610 can place the driver name information piece for police unit 630 into a general storage area. At a later time, the EMT unit 640 can search the general storage area to find the driver name.

Figure 9A:
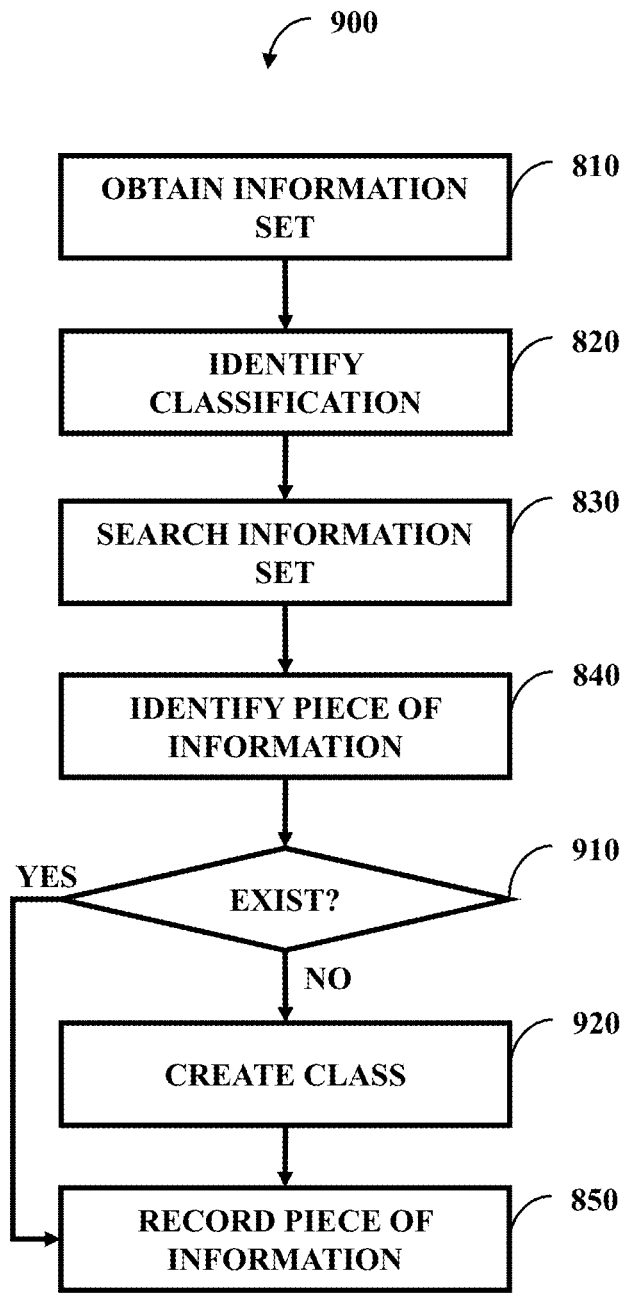
FIG. 9A illustrates one embodiment of a method comprising seven actions.
Figure 9B:
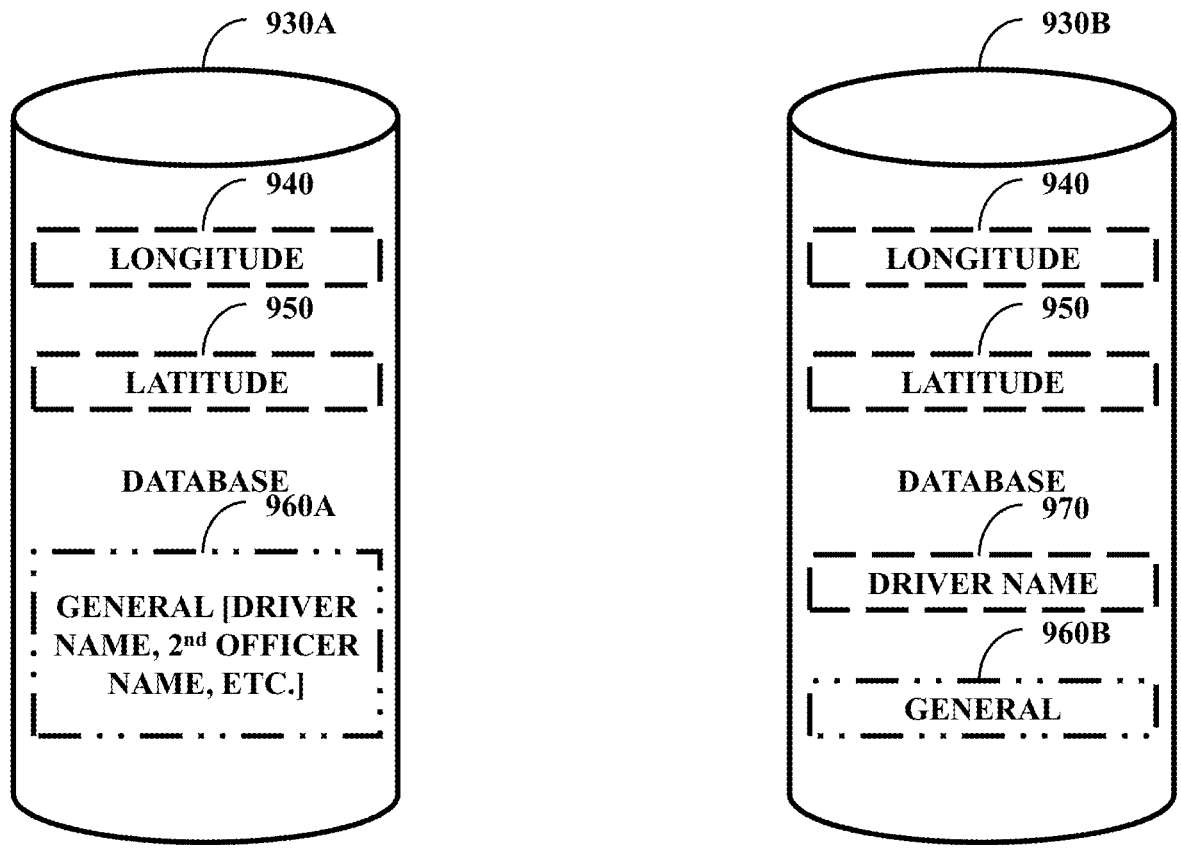
FIG. 9B illustrates one embodiment of two versions of a database.

FIG. 9A illustrates one embodiment of a method 900 comprising seven actions 810-850 and 910-920 and FIG. 9B illustrates one embodiment of two versions 930A and 930B of the database. At 910, a check can occur that identifies a piece of information in the information set as meeting or not meeting an existing information classification. If such a class does not exist, then creating a new information classification for the piece of information in the information set that does not meet the existing information classification can take place at 920. At 850, recording the piece of information in the information set that does not meet the existing information classification in a database location associated with the new information classification can take place.

As an example of this with the scenario with FIG. 6, the database 930 can be initially configured as in version 930A with two specific locations—one for longitude 940 and one for latitude 950 and the remainder placed in a general location 960. Initially with version 930, when the driver name information is received it can simply be stored in the general location 960A such that the driver name can be found, but it is more difficult to find than the longitude and latitude. However, as time goes on is can be determined that many accesses are made to the driver name and therefore the driver name should have its own dedicated location 970 while the general location remains in version 960B. When a determination is made that a new specific location should be made, then the method 800 can function to create that new location and cause the new location to be populated with appropriate information.

Figure 10:
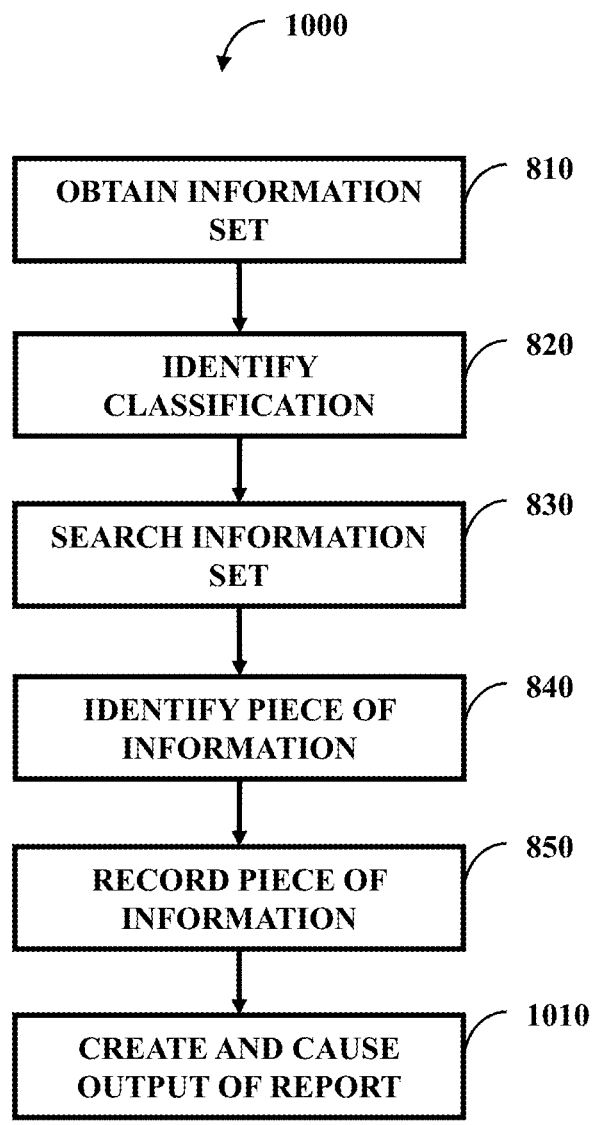
FIG. 10 illustrates one embodiment of a method comprising six actions.

FIG. 10 illustrates one embodiment of a method 1000 comprising six actions 810-850 and 1010. The database 930 of FIG. 9B can be accessed by multiple users. Again returning to the scenario of discussed with FIG. 6, the different unity 610-640 can access the database 930 of FIG. 9B. Along with saving information in the database 930 of FIG. 9B, reports can be run on the database (e.g., a manner of searching the database). At 910, a report can be from the database and the report can be made accessible. The report can comprise the piece of information that meets the information classification and/or the piece of information that does not meet the classification (e.g., that is accessed from the general location 970 of FIG. 9 or is accessed from a later created location).

Figure 11:
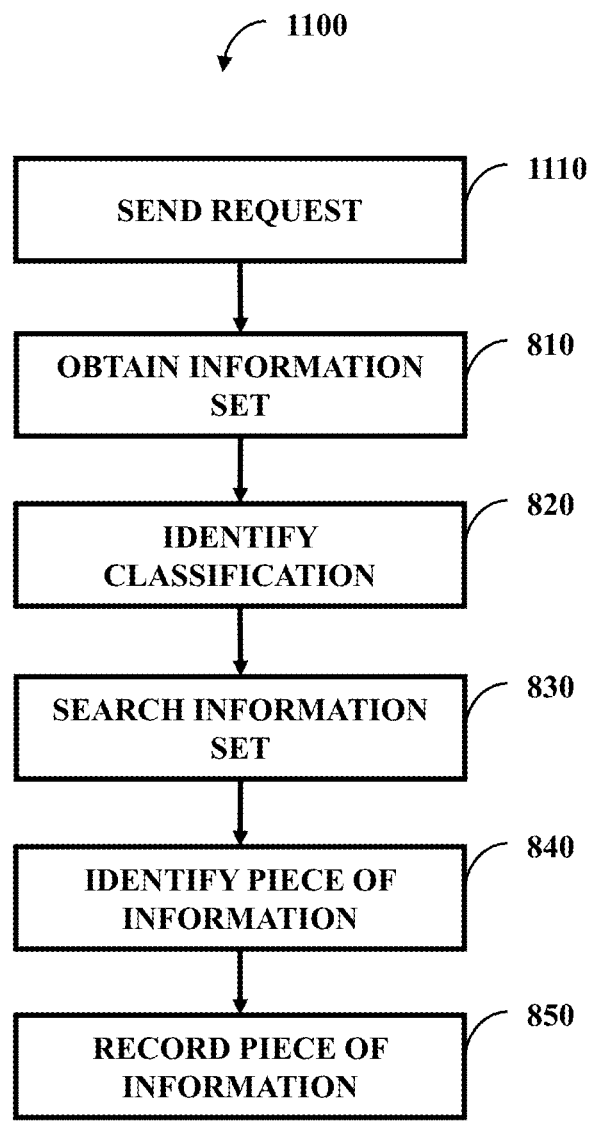
FIG. 11 illustrates one embodiment of a method comprising six actions.

FIG. 11 illustrates one embodiment of a method 1100 comprising six actions 810-850 and 1110. At 1110, sending a request for the information set in a virtual machine class to a personal electronic device can take place. A structure of the virtual machine class is unknown to the personal electronic device upon collection of the request. The personal electronic device can convert the virtual machine class into a markup language. The information set can be an entry into the user interface that is based, at least in part, on the markup language. The entry and the markup language are can be combined together and converted into the virtual machine class. Searching the information set for the piece of information that meets the information classification occurs upon the converted virtual machine class.

In one example, two mobile devices—a first mobile device and a second mobile device—can communicate with one another and they can individually use different data structures. The first mobile device can run the method 1100 and at 1110, send a request to the second mobile device in a first data structure. The second mobile device can function with the second data structure and therefore can process the first data structure in accordance with aspects disclosed herein. This can include sending a response back to the first mobile device in the first data structure so the first mobile device can easily process the information. In one embodiment, the second mobile device does not send the information set in the first data structure, but instead to its native second data structure. In this, the mobile devices transmit information in their own data structure and a receiving device can perform processing (e.g., used when a recipient is different from a requestor or when the second mobile device has limited resources in comparison to the first mobile device).

Figure 12:
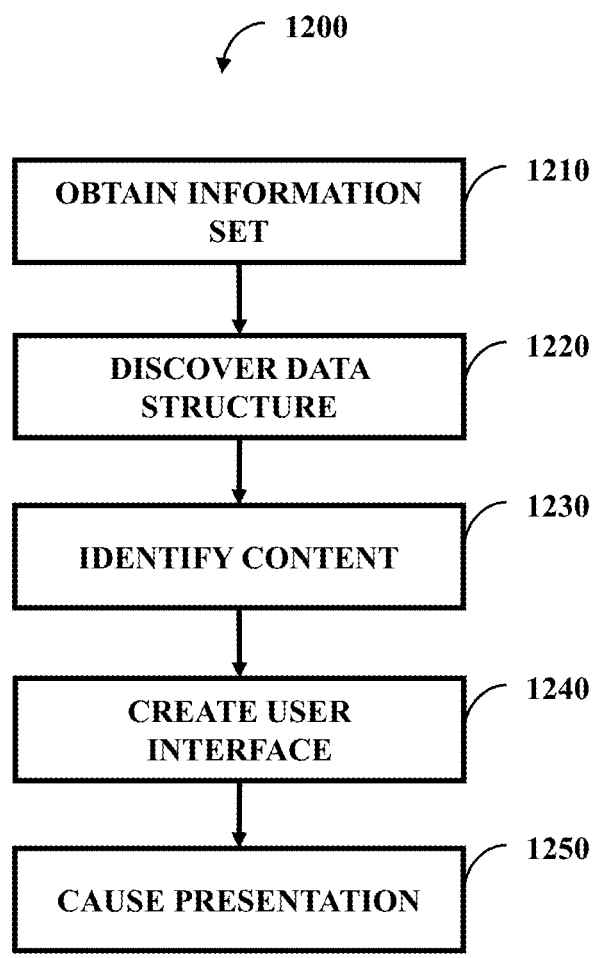
FIG. 12 illustrates one embodiment of a method comprising five actions.

FIG. 12 illustrates one embodiment of a method 1200 comprising five actions 1210-1250. At 1210, obtaining an information set of an unknown data structure takes place. At 1220, discovering the data structure of the information set after the information set is obtained such that the unknown data structure is known can take place. Identifying the content of the information set after the data structure is discovered can take place at 1230. At 1240, creating a user interface upon which to display at least part of the content can occur and at 1250, causing presentation of the user interface can take place. In one example, the user interface can be presented as part of a map on a display of a mobile communication device. With this example, the user interface can be considered an entire map (e.g., as the user interface 140 in FIG. 6B illustrates) or in item on a map (e.g., the icon 680B of FIG. 6B).

While discussed above for an unknown data structure, these actions can occur for multiple data structures (e.g., take place simultaneously), such as a first information set of a first data structure and a second information set of a second data structure. The first data structure and the second data structures can be different such that one device that runs the method 1200 can process different unknown data structures. Additionally, a first user interface derived from the first data structure and a second user interface derived from the second data structure can be presented simultaneously or at different times. The format of the first user interface and the format of the second user interface can be identical or different. An information set can be entered into the user interface. The information set entered into the user interface can be accessed, the information set can be converted into the data structure, and the converted data structure can be caused to be outputted.

Figure 13:
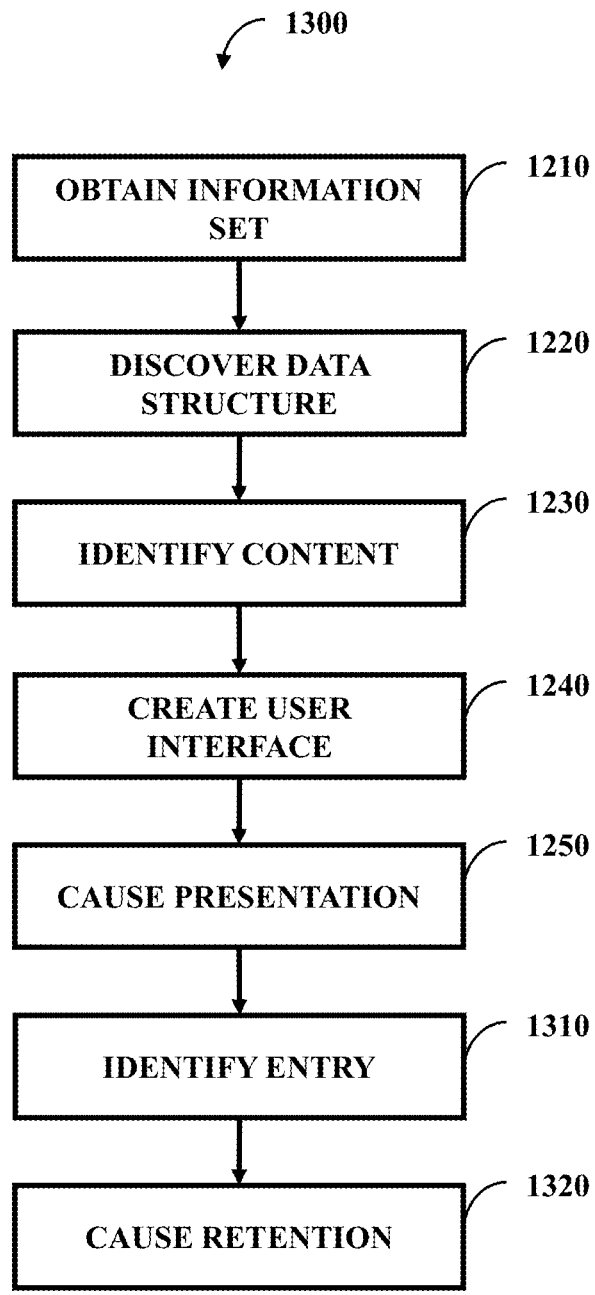
FIG. 13 illustrates one embodiment of a method comprising seven actions.

FIG. 13 illustrates one embodiment of a method 1300 comprising seven actions 1210-1250 and 1310-1320. At 1310, identifying a part of an entry into the user interface as a recognized classification can occur. At 1320, causing retention of the part of the entry into the user interface that is of the recognized classification in a storage location associated with the recognized classification can take place. Likewise, at 1310, identifying a part of an entry into the user interface set as an unrecognized classification can occur. At 1320, causing retention of the part of the entry into the user interface that is of the unrecognized classification in a general storage location can take place.

Figure 14:
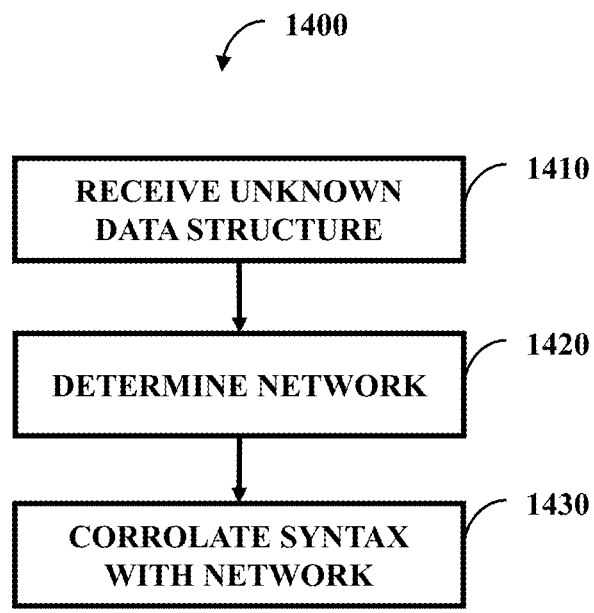
FIG. 14 illustrates one embodiment of a method comprising three actions.

FIG. 14 illustrates one embodiment of a method 1400 comprising three actions 1410-1430. Different syntaxes can mean different things on different networks and when receiving an unknown data structure, at 1410, it can be beneficial to know what the syntax of that unknown data structure means. Therefore, at 1420, a network from which the data structure is received can be determined. At 1430, the syntax can be correlated with the determined network and the syntax can be interpreted as such.

Figure 15:
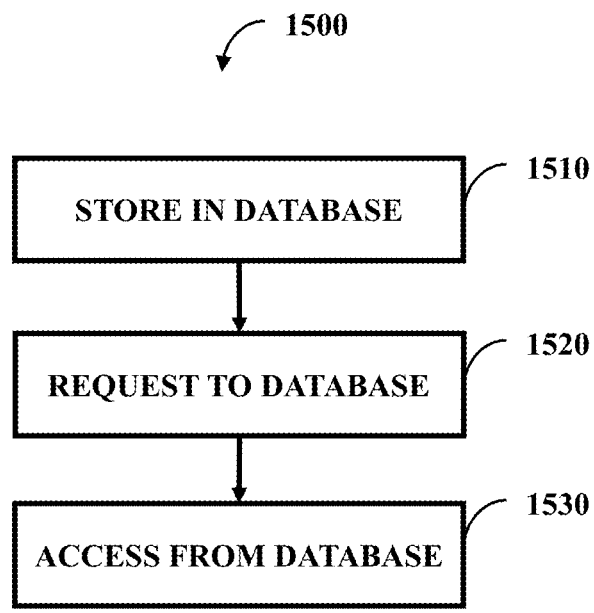
FIG. 15 illustrates one embodiment of a method comprising three actions.

FIG. 15 illustrates one embodiment of a method 1500 comprising three actions 1510-1530. These three actions 1510-1530 can be how the mobile device 110 of FIG. 1 interacts with a database. The mobile device 110 of FIG. 1 can receive the data structure 130A as a position report with position information (e.g., longitude, latitude, elevation, etc.) and content of the position report can be stored in the database at 1510. The mobile device 110 of FIG. 1, when at runtime the user interface 140 of FIG. 1 is being created, can request information from the database at 1520 and access the position information from the database at 1530.

In one example, the mobile device 110 of FIG. 1 can store various information pieces in the database at 1510 or these can be stored in the database by another entity. With this example, the mobile device 110 of FIG. 1 can obtain the data structure 130A and at runtime recognize that the data structure 130A is a position report. With this understanding, the mobile device 110 of FIG. 1 can determine other information that can be beneficial to make a proper user interface from the position report. The mobile device 110 of FIG. 1 can then request this other information from the database 1520 and the database can provide access to this other information at 1530. In one example, the other information can be a previous position of an entity that the position report describes so an operator of the mobile device 110 of FIG. 1 can a movement pattern of the entity that the position report describes.

Figure 16:
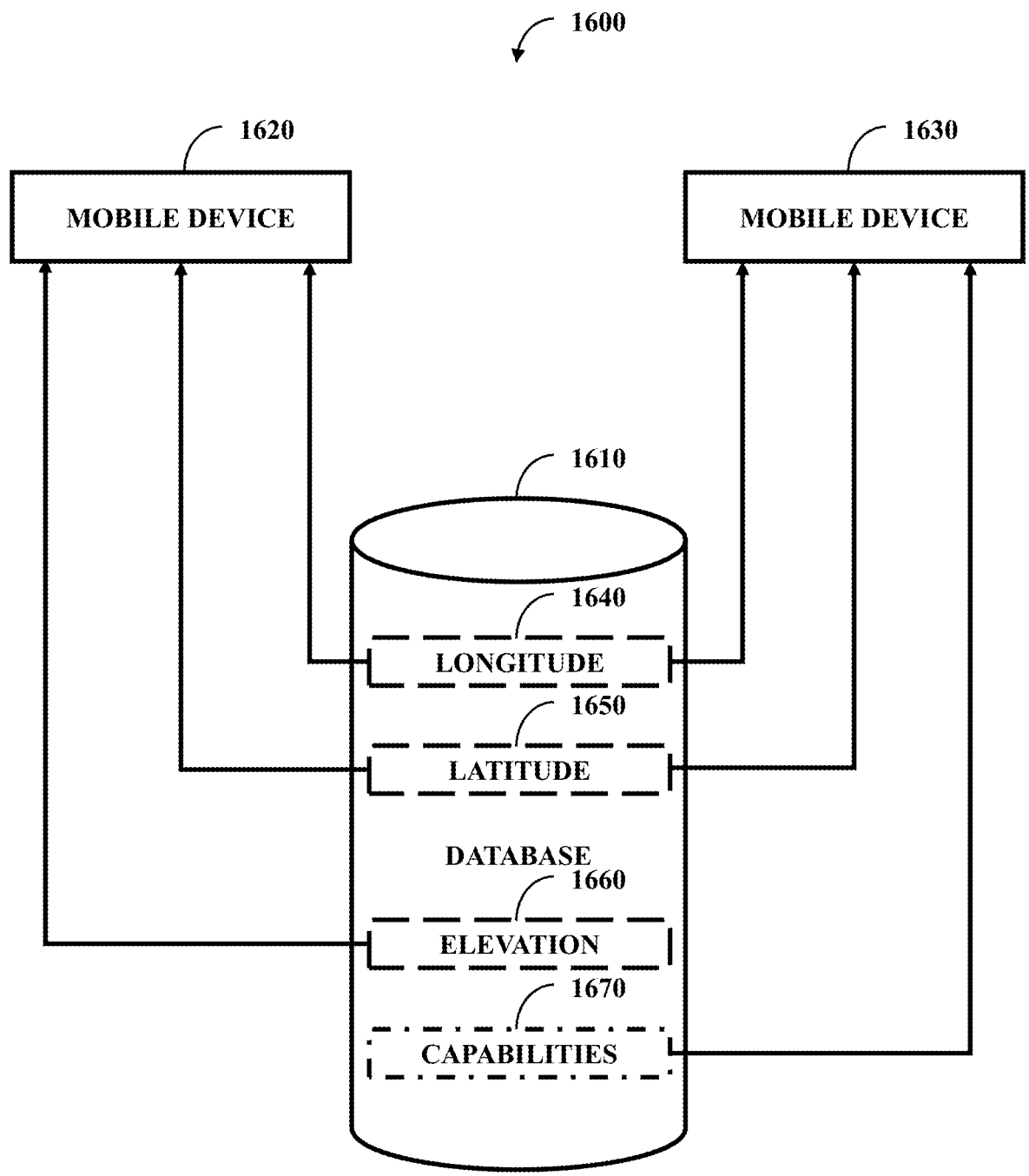
FIG. 16 illustrates one embodiment of an environment upon which at least some aspects disclosed herein can be practiced.

FIG. 16 illustrates one embodiment of an environment 1600 upon which at least some aspects disclosed herein can be practiced. A database 1610 can interact with two mobile devices 1620 and 1630. The mobile devices 1620 and 1630 can modify and access the database. When an unknown data structure is received, the content of the data structure can be retained in the database. As with FIG. 15, the unknown data structure can be a position report. The position report can include four pieces of information: longitude, latitude, elevation, and capabilities. In one example, the mobile device 1620 can receive the unknown data structure and cause the four pieces of information to be stored in the database 1610—in this example, longitude entry 1640, latitude entry 1650, and elevation entry 1660 can be in specific locations and the capabilities entry 1670 can be in the general location. This configuration can be due to mobile device often using the three specific pieces and therefore the database can be structured by the mobile device 1620 to have specific locations for these pieces. However, since mobile device 1620 does not use capabilities, that piece of information can be stored in a general storage configuration on the database 1610. Mobile device 1620 can then access the specific information from the database. While mobile devices are discussed in various examples herein, such as mobile devices 1620 and 1630, other personal electronic devices can be used, such a non-mobile computer, as well as other devices.

Along with mobile device 1620, mobile device 1630 can access the database 1610. The mobile device can access different information than the mobile device 1620. Additionally, the mobile device 1630 can reconfigure the database 1610 different from how mobile device 1620 configures the database 1610. In one example, the mobile device 1630 can remove the capabilities entry 1670 from the general location and convert it into a specific location (e.g., make the capabilities an indexed location). Therefore, the mobile device 1630 can dynamically index the database 1610.

The mobile devices 1620 and 1630 can also generate reports from the database 1610. Example report generation can include fill in a report that exists, create a new report type, or clone a report from an existing report type. Additionally, from the mobile devices 1620 and 1630, reports can be retained in the database 1610 as well as moved, modified, deleted, etc. While a singular database is illustrated, other configurations can be used, such as a distributed database (e.g., where nodes store the same information, but indexed differently where some information is general in some nodes and some specific in others).

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A processor configured to execute a command set, the command set stored by a computer-readable medium, to effectuate operation of a component set, the component set, the component comprising:
   a collection component configured to collect an information set formatted in a data structure, the data structure being unknown to the collection component upon collection and a content of the information set being unknown to the collection component upon collection;
   an evaluation component configured to perform an evaluation of the information set after collection, the evaluation determines the content of the information set;

a creation component configured to create a user interface that discloses at least part of the content of the information set;
an output component configured to cause disclosure of the user interface upon a display
an entry component configured to access an entry in a markup language into the user interface;
an analysis component configured to analyze the entry into the user interface to determine a content of the user interface; and
a retention component configured to cause retention of at least part of the entry into a database,
a conversion component configured to convert the entry into an instance; and
a combination component configured to combine the instance with a definition into a single construct,
where the user interface is created from the definition,
where the creation component is, in creation of the user interface, configured to convert the data structure into the definition and
where the data structure is a virtual machine class.

2. The processor of claim 1, the component set comprising:
a transfer component configured to cause a transfer of the single construct to an entity that provides the information set formatted in the data structure,
where the single construct is in the virtual machine class.

3. The processor of claim 1,
where the conversion component is configured to convert the entry into an instance by way of a parser and
where the combination component is configured to combine the instance with the definition into the single construct by way of a forge.

4. A system, comprising:
a computer-readable medium configured to retain an instruction set; and
a processor configured to execute the instruction set,
where execution of the instruction set facilitates operation of a component set,
where the component set comprises a collection component configured to collect an information set formatted in a data structure, the data structure being unknown to the collection component upon collection and a content of the information set being unknown to the collection component upon collection,
where the component set comprises an evaluation component configured to perform an evaluation of the information set after collection, the evaluation determines the content of the information set,
where the component set comprises a creation component configured to create a user interface that discloses at least part of the content of the information set,
where the component set comprises an output component configured to cause disclosure of the user interface upon a display,
where the component set comprises an entry component configured to access an entry in a markup language into the user interface,
where the component set comprises an analysis component configured to analyze the entry into the user interface to determine a content of the user interface, and
where the component set comprises a retention component configured to cause retention of at least part of the entry into a database,
where the retention component is configured to cause retention of part of the content in a database in a content-specific location, and
where the retention component is configured to cause retention of part of the content in a database in a general location.

5. A non-transitory computer-readable medium, communicatively coupled to a processor, that stores a command set executable by the processor to facilitate operation of a component set, the component set comprising:
a collection component configured to collect an information set formatted in a data structure, the data structure being unknown to the collection component upon collection and a content of the information set being unknown to the collection component upon collection;
an evaluation component configured to perform an evaluation of the information set after collection, the evaluation determines the content of the information set;
a creation component configured to create a user interface that discloses at least part of the content of the information set; and
an output component configured to cause disclosure of the user interface upon a display
where the data structure is a virtual machine class,
where the evaluation component is configured to convert the data structure from a virtual machine class to a definition, and
where the creation component is configured to use the definition to create the user interface.

6. The non-transitory computer-readable medium of claim 5, the component set comprising:
an entry component configured to access an entry into the user interface;
an analysis component configured to analyze the entry into the user interface to determine a content of the user interface; and
a retention component configured to cause retention of at least part of the entry into a database,
where the entry is in a markup language.

7. The non-transitory computer-readable medium of claim 5,
where the creation component is configured to employ a renderer to convert the definition to a markup language and
where the markup language is used to create the user interface.

8. The non-transitory computer-readable medium of claim 5, the component set comprising:
a visualization component configured to produce a visualization that represents at least part of the information set,
where the output component is configured to cause disclosure of the visualization upon the display.

9. A method, comprising:
obtaining an information set in an unknown format;
identifying an information classification expected in the information set;
searching the information set for a piece of information that meets the information classification;
identifying the piece of information that meets the information classification as a result of the search; and
recording the piece of information that meets the information classification in a database location associated with the information classification.

10. The method of claim 9, comprising:
identifying a piece of information of the information set that does not meet the classification; and recording the piece of information of the information set that does not meet the classification in a general storage location of the database,
where the piece of information that meets the information classification is recorded in a specific storage location of the database different from the general storage location.

11. The method of claim 9, comprising:
identifying the piece of information in the information set that does not meet an existing information classification;
creating a new information classification for the piece of information in the information set that does not meet the existing information classification; and
recording the piece of information in the information set that does not meet the existing information classification in a database location associated with the new information classification.

12. The method of claim 9, comprising:
sending a request for the information set in a virtual machine class to a personal electronic device;
where a structure of the virtual machine class is unknown to the personal electronic device upon collection of the request,
where the personal electronic device converts the virtual machine class into a markup language,
where the information set is an entry into a user interface that is based, at least in part, on the markup language,
where the entry and the markup language are combined together and converted into the virtual machine class, and
where searching the information set for the piece of information that meets the information classification occurs upon the converted virtual machine class.

13. The method of claim 9,
where identifying the information classification expected in the information set occurs without, at the time of or before identifying the information classification expected in the information set, determining an actual information classification in the information set.

14. A method, comprising:
obtaining a first information set of an unknown data structure;
discovering, at runtime, the data structure of the first information set after the first information set is obtained such that the unknown data structure is known;
identifying, at runtime, the content of the first information set after the data structure is discovered;
creating a first item for presentation upon a display based, at least in part, on the content causing presentation of the first item upon the display;
obtaining a second information set of an unknown data structure;
discovering the data structure of the second information set after the second information set is obtained such that the unknown data structure of the second information set is known;
identifying the content of the second information set after the data structure of the second information set is discovered;
creating a second item for presentation upon the display based, at least in part, on the content of the second information set; and
causing presentation of the second item upon the display,
where the data structure of the first information set and the data structure of the second information set are different data structures,
where a format of the first item and a format of the second item are different,
where the first item and second item are caused to be presented concurrently, and
where the first item and the second item are presented concurrently on a single map.

15. The method of claim 14, comprising:
identifying a minimum information to correctly create the first item;
selecting the content of the first information set that corresponds to a minimum information to correctly create the first item;
identifying a minimum information to correctly create the second item; and
selecting the content of the second information set that corresponds to a minimum information to correctly create the second item,
where creating the first item for presentation upon the display is based, at least in part, on the selected content of the first information set that corresponds to the minimum information to correctly create the first item and
where creating the second item for presentation upon the display is based, at least in part, on the selected content of the second information set that corresponds to the minimum information to correctly create the second item.

16. The method of claim 15,
where the minimum information to correctly create the first item comprises a first latitude and a first longitude,
where the first item is presented on the map at a location that corresponds to the first latitude and the first longitude,
where the minimum information to correctly create the second item comprises a second latitude and a second longitude, and
where the first item is presented on the map at a location that corresponds to the second latitude and the second longitude.

17. The method of claim 16,
where the minimum information to correctly create the first item comprises a first icon indicator,
where the minimum information to correctly create the second item comprises a second icon indicator, and
where the first icon indicator and the second icon indicator are different.

18. The method of claim 16,
where the minimum information to correctly create the first item comprises a first icon indicator,
where the minimum information to correctly create the second item comprises a second icon indicator, and
where the first icon indicator and the second icon indicator are not different.

19. A method, comprising:
obtaining an information set of an unknown data structure;
discovering, at runtime, the data structure of the information set after the information set is obtained such that the unknown data structure is known;
identifying, at runtime, the content of the information set after the data structure is discovered;
creating an item for presentation upon a display via a user interface based, at least in part, on the content;
causing presentation of the item upon the display;
identifying a part of an entry into the user interface as a recognized classification;

identifying a part of an entry into the user interface set as an unrecognized classification;

causing retention of the part of the entry into the user interface that is of the recognized classification in a storage location associated with the recognized classification; and causing retention of the part of the entry into the user interface that is of the unrecognized classification in a general storage location.

20. The method of claim 19, comprising:

accessing an information set entered into the user interface;

converting the information set into the data structure; and causing the converted data structure to be outputted.

\* \* \* \* \*